Oct. 3, 1961   R. C. DREIER   3,002,542
HACKSAW CONSTRUCTION
Filed Oct. 29, 1959   2 Sheets-Sheet 1
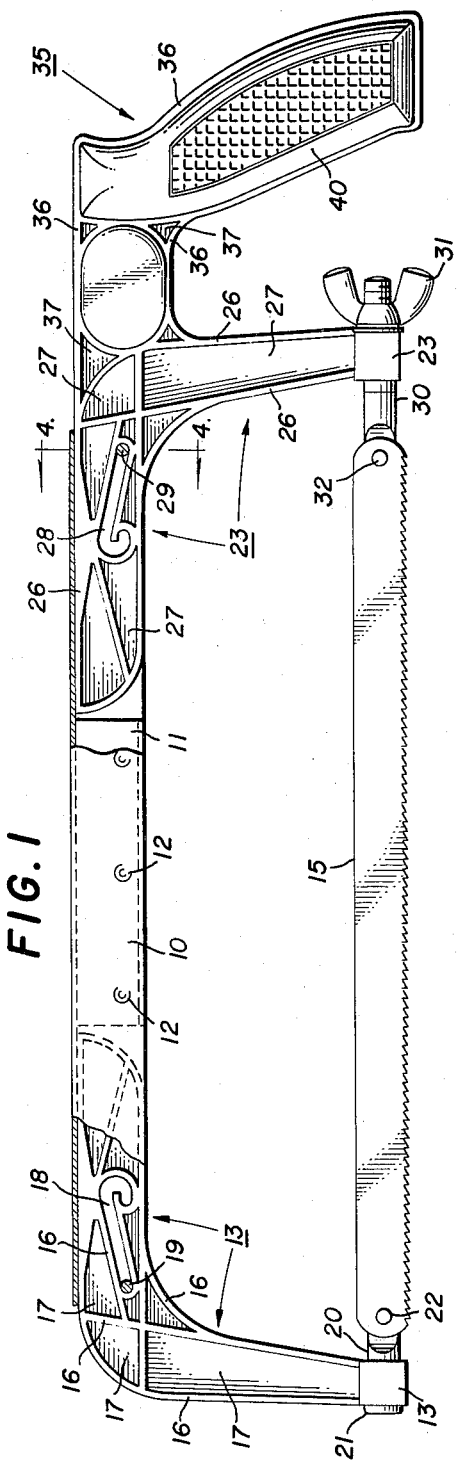
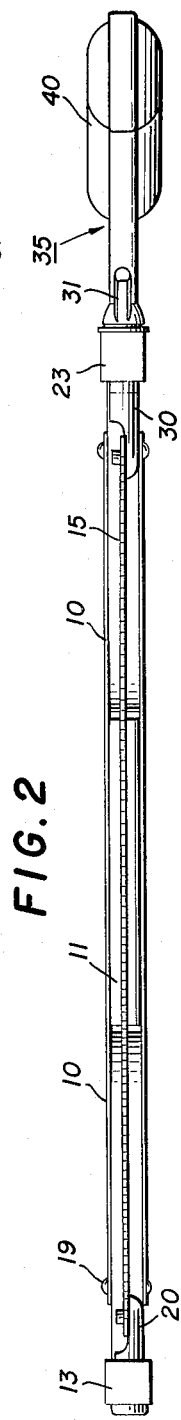
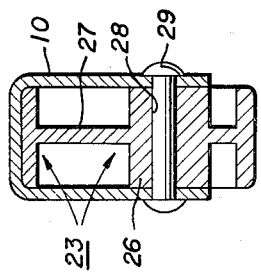
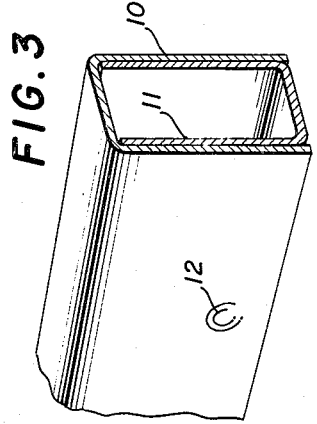
INVENTOR.
RAYMOND C. DREIER
BY Prangley, Baird,
Clayton, Miller & Vogel
ATTORNEYS Oct. 3, 1961  R. C. DREIER  3,002,542
HACKSAW CONSTRUCTION
Filed Oct. 29, 1959  2 Sheets-Sheet 2
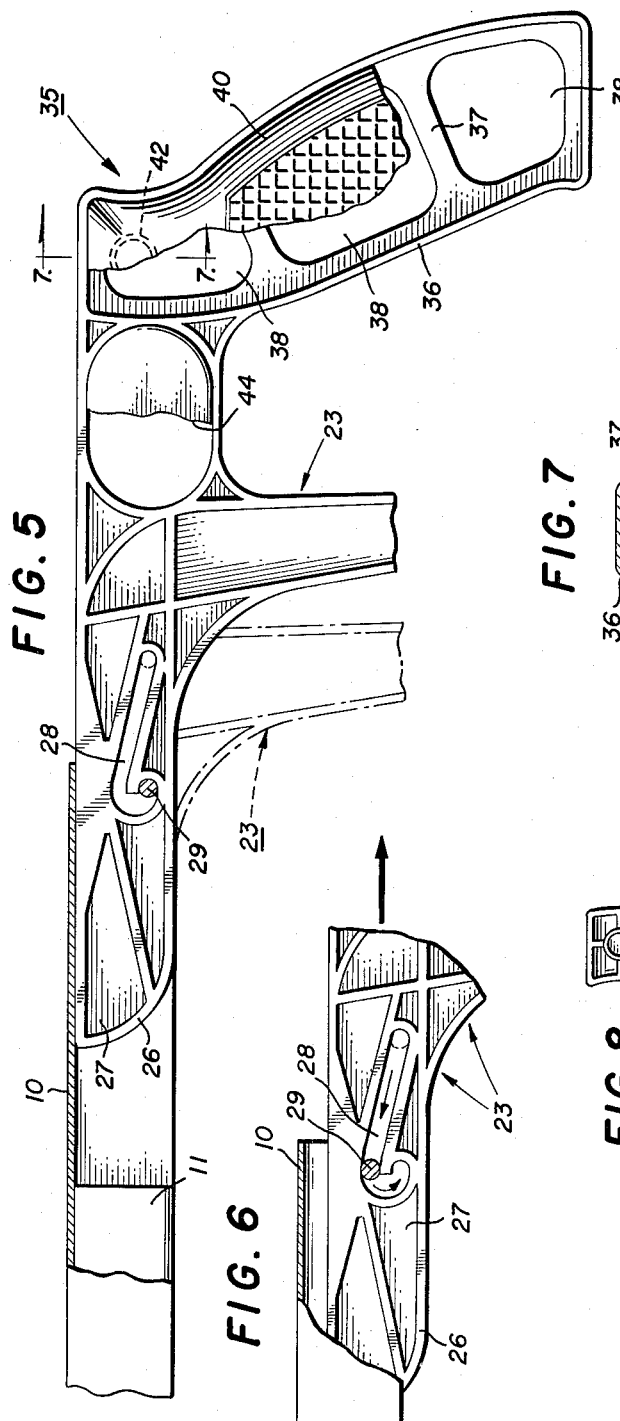
INVENTOR.
RAYMOND C. DREIER
BY Prangley, Baird,
Clayton, Miller & Vogel
ATTORNEYS U̲n̲i̲t̲e̲d̲ ̲S̲t̲a̲t̲e̲s̲ ̲P̲a̲t̲e̲n̲t̲ ̲O̲f̲f̲i̲c̲e̲

3,002,542
Patented Oct. 3, 1961

3,002,542
HACKSAW CONSTRUCTION
Raymond C. Dreier, 6930 South Shore Drive, Chicago, Ill.
Filed Oct. 29, 1959, Ser. No. 849,547
5 Claims. (Cl. 145—34)

This invention relates to a saw blade holder and more particularly to an adjustable saw blade holder adapted for use with saw blades of different lengths. An exemplification of such an adjustable saw blade holder is the frame of a hack saw.

Known saw blade holders of the type considered herein are, for the most part, difficult to adjust and are also difficult to handle during the removal and replacement of a saw blade because the holder or frame slips loosely from one position to another when the restricting tension of the blade is released. Further, a substantial amount of slack must be taken up by the blade tightening means before the blade can be properly tensioned in holders of the prior art, and in some prior structures there is a tendency for the frame or holder to slip from one position of adjustment to another as the blade is being tensioned.

These are all disadvantages, and an object of the present invention is to provide a saw blade holder or frame that obviates the same.

Another object of the invention is in the provision of a saw blade holder or frame that is quickly and easily adjustable to accept saw blades of different lengths and which is held securely in any adjusted position thereof even when the saw blade is removed, whereby interchanging one blade for another is greatly simplified.

Still another object is that of providing a frame or holder which cannot slip from one position of adjustment to another as a saw blade is being tensioned therein and which does not have substantial slack or looseness which must be taken up before a blade can be properly tensioned.

The invention, both as to its organization and method of operation, together with further objects and advantages thereof, will best be understood by reference to the following specification, taken in connection with the accompanying drawings, in which:

FIGURE 1 is a side elevational view, partially broken away, of a hack saw having an adjustable saw blade holder constructed in accordance with the present invention;

FIGURE 2 is a bottom plan view of the structure shown in FIGURE 1;

FIGURE 3 is a broken perspective view of a portion of the blade holder;

FIGURE 4 is a vertical sectional view taken in the direction of the arrows along the line 4—4 of FIGURE 1;

FIGURE 5 is an enlarged, broken side elevational view of the saw blade holder, partially broken away, and illustrating adjusted positions of the holder;

FIGURE 6 is an enlarged, side elevational view of the holder, similar to FIGURE 5, but showing the holder intermediate the two positions of adjustment;

FIGURE 7 is a further enlarged, vertical sectional view taken in the direction of the arrows along the line 7—7 of FIGURE 5; and FIGURE 8 is a side elevational view illustrating the inner surface of a handle insert included in the saw blade holder of FIGURES 1 to 7.

The saw blade holder or frame illustrated in the drawings includes in an inverted U-shaped channel defining a frame member 10 that extends longitudinally and is the fixed or stationary component of the frame structure. Centrally the frame member 10 is preferably reinforced by a U-shaped insert 11 which may be rigidly secured to the member 10, as with spot welds. The insert 11, as shown best in FIGURE 1, terminates at spaced distances from the ends of the member 10, and positioned within the respective open end portions of the member 10 are a pair of legs forming with the member 10 the frame or saw blade holder.

The leg located along the left end of the member 10, as viewed in FIGURE 1, is denoted with the numeral 13 and has an inverted L-shaped configuration. One extremity of the leg is inserted into the frame member 10, while the other extremity extends downwardly therefrom. The leg 13 may be a die casting and comprises laterally extending flange portions 16 interconnected by web 17. Along the upper or horizontal extremity of the leg 13, the flange portions 16 define an upwardly and inwardly extending slot 18 having a pin 19 extending therethrough which is fixedly secured to the frame member 10. The pin 19 is freely movable through the slot 18 and in the specific structure shown, the pin 19 is a rivet permanently securing the leg 13 to the frame member 10. At its lower free end, the leg 13 is equipped with a fastener 20 of conventional design having a head 21 that limits longitudinal movement of the fastener in one direction through the tubular end portion of the leg. The fastener is also provided with a laterally extending pin or anchor 22 adapted to enter an opening provided therefor at the end of a conventional saw blade 15. Since the fastener 20 is of conventional design, it need not be described in further detail herein, and as is well known, will be provided with a square shaped shank portion that cooperates with a corresponding square shaped opening through the cylindrical end portion of the leg 13 to prevent relative rotation therebetween but such square shaped shank portion may be withdrawn from the cylindrical end of the leg 13 to permit the fastener to be rotated for the purpose of disposing the anchor pin 22 in any one of four possible positions which then affords selective orientation of the saw blade 15.

The leg located along the right end of the member 10, as viewed in FIGURE 1, is denoted with the numeral 23 and has an inverted, generally L-shaped configuration. One extremity of the leg is inserted into the frame member 10, while the other extremity extends downwardly therefrom. The leg 23 may be a die casting and comprises laterally extending flange portions 26 interconnected by a web 27. Along the upper horizontal extremity of the leg 23, the flange portions 26 define an upwardly and inwardly extending slot 28 having a pin 29 extending therethrough which is fixedly secured to the frame member 10. The pin 29 is freely movable through the slot 28 and in the specific structure shown, the pin 29 is a rivet permanently securing the leg 23 to the frame member 10.

At its lower free end the leg 23 is equipped with a fastener 30 of conventional design, threaded at one end to receive a wing nut 31 that when tightened moves the fastened 30 relative to the leg 23 so as to tension the saw blade 15 which is connected to the fastener by means of a laterally extending pin or anchor 32 adapted to enter an opening provided therefor at the end of the saw blade. Since the fastener 30 is of conventional design, it need not be described in further detail herein, and as is well known, will be provided with a square shaped shank portion that cooperates with a corresponding square shaped opening through the cylindrical end portion of the leg 23 to prevent relative rotation therebetween, but such square shaped shank portion may be withdrawn from the cylindrical end of the leg 23 to permit the fastener to be rotated for the purpose of disposing the anchor pin 32 in any one of four possible positions which then affords selective orientation of the saw blade 15.

The leg 23 is equipped with a handle 35 preferably formed integrally therewith. The handle has laterally extending, generally perimetric flange portions 36 interconnected with a web 37 that may have a plurality of openings 38 provided therealong. The grip of the handle 35 is formed by a pair of inserts 40 which are shaped so as to lie within the dimensional limits of the perimetric flange 36. As is shown best in FIGURES 7 and 8, one of the inserts 40 is equipped along the inner side thereof with a plurality of wall portions respectively defining a plurality of cylindrical collars 41 adapted to receive therein the respective tubular protrusions or necks 42 provided by the other insert. In order to anchor the inserts in position along the handle 35, telescopically engaged collars 41 and necks 42 may define press fits and may be cemented or otherwise adhesively anchored to each other. As illustrated in FIGURE 8, the handle inserts 40 are preferably provided with a plurality of ribs 43 that stiffen and reinforce the same. The inserts may be formed of any suitable material such as plastic. The handle 35 is also of generally L-shaped configuration and the grip thereof, comprising the inserts 40, is spaced slightly from the depending extremity of the leg 23 and the handle section extending therebetween may have concave areas 44 along each side thereof.

The legs 13 and 23 are oriented in facing relation and are each movable longitudinally along the frame member 10 between a first or inner position, shown in FIGURE 1, and a second or outer position, illustrated by full lines in FIGURE 5. When the legs are in the first or inner position, the spacing between the fasteners 20 and 30 is at a minimum and the structure is then in condition for receiving a relatively short saw blade 15 having a length that corresponds to such spacing. A saw blade of slightly greater length is accommodated by the structure when one or the other of the legs 13 and 23 is moved outwardly into the second position thereof. A saw blade of still greater length can be accommodated by the structure when both of the legs 13 and 23 are moved outwardly and into their second or outer positions.

As is shown most clearly in FIGURE 6, the legs 13 and 23 are displaced downwardly with respect to the top wall of the frame member 10 when the legs are moved longitudinally from the first inner to the second outer positions thereof.

However, in either of their two positions, the horizontal extremity of each leg is substantially contiguous with the top wall of the frame member 10, as is shown in FIGURE 5. Each leg is displaced downwardly upon outward longitudinal movement thereof because of the inclination of the slot thereof and cooperation of such slot with the stationary pin extending therethrough. This same relationship displaces each leg upwardly when it is moved from its outer to its inner position. It should be noted that though the slots 18 and 28 incline upwardly and inwardly, each such slot at the inner end thereof is provided with a hook-shaped portion adapted to seat the associated pin therein and the hook-shaped inner end portions of the slots and outer end portions thereof are all disposed in longitudinal alignment along the frame member 10.

The legs 13 and 23 tend to maintain either of their adjusted positions because the frame member 10 and each of the legs tend to move angularly with respect to each other about the pivotal axes defined by the pins 19 and 29. However, relative angular movement is constrained in either direction because of the substantial abutment of the horizontal extremities of the legs with the top wall of the frame member 10. The frictional resistance to movement resulting from such abutment tends to restrict longitudinal movement of the legs relative to the frame member 10. However, while inadvertent longitudinal movements are restricted in this manner, the legs 13 and 23 may be readily moved manually from one position of adjustment to another.

The legs 13 and 23 cannot slip when the nut 31 is tightened to tension the blade 15 because as the blade is tensioned, an inwardly directed force is applied to the lower extremities of the legs which tends to respectively rotate the legs 13 and 23 in a counterclockwise and clockwise direction, as seen in FIGURE 1, as well as to displace the legs inwardly toward the center of the frame member 10. However, the legs cannot be displaced inwardly because of the abutment of the pins 19 and 29 with the outer ends of the slots 18 and 28 or with the inner hook-shaped ends thereof. Further, the legs cannot be rotated because of the abutment of the upper horizontal extremities thereof with the top wall of the frame member 10. It will be appreciated that with the construction described, there is substantially no slack to be taken up before the blade 15 can be tensioned and any wearing of the pins 19 and 29 or the respectively associated slots 18 and 28 is readily accommodated without materially changing the interaction, cooperation and functioning of the legs and frame member.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a saw blade holder adapted to accommodate blades of various lengths, a pair of cooperating frame members movable longitudinally with respect to each other, one of said frame members being provided with a longitudinally extending slot closed at the opposite ends thereof and the other of said frame members being equipped with a pin extending transversely through said slot and being movable longitudinally therealong between a first position in substantial abutment with one end of said slot whereas said saw blade holder is adjusted to accommodate saw blades of one length and a second position in substantial abutment with the other end of said slot whereat said saw blade holder is adjusted to accommodate saw blades of another length, said slot having a main portion inclined with respect to a line through the ends of said slot and having an offset portion at one end of said main portion to provide communication between said ends of said slot, said frame members having portions thereof in substantial abutment when said pin is at either end of said slot so as to constrain said frame members against relative angular movement about the axis defined by said pin.

2. In a saw blade holder adapted to accommodate blades of various lengths, a pair of cooperating frame members movable longitudinally with respect to each other, one of said frame members being provided with a longitudinally extending slot closed at the opposite ends thereof and the other of said frame members being equipped with a pin extending transversely through said slot and being movable longitudinally therealong between a first position in substantial abutment with one end of said slot whereas said saw blade holder is adjusted to accommodate saw blades of another length, said slot having a main portion inclined with respect to a line through the ends of said slot and having an offset portion at one end of said main portion to provide communication between said ends of said slot, said main portion extending inwardly toward said offset portion and away from the associated blade, said frame members having portions thereof in substantial abutment when said pin is at either end of said slot so as to constrain said frame members against relative angular movement about the axis defined by said pin.

3. In a saw blade holder adapted to accommodate blades of various lengths, a first frame member and a pair of second frame members, each of said second frame members including a first leg slidably engageable with said first frame member and a second leg disposed at an angle with respect to said first leg, said second legs extending in the same direction from said first frame member and being adapted to have a saw blade tensioned therebetween, each of said first legs being provided with a longitudinally extending slot closed at the opposite ends thereof, said first frame member having a pair of pins respectively extending transversely through said slots and being movable longitudinally therealong between a first position in substantial abutment with one end of the associated slot whereat said frame members are adjusted to accommodate saw blades of one length and a second position in substantial abutment with the other end of the associated slot whereat said frame members are adjusted to accommodate saw blades of another length, each of said slots having a main portion inclined with respect to a line through the ends thereof and having an offset portion at one end of said main portion to provide communication between the ends thereof, said first frame member and each of said second frame members having portions thereof in substantial abutment when said pins are at either end of the respectively associated slots so as to constrain said frame members against relative angular movement about the axes defined by said pins.

4. In a saw blade holder adapted to accommodate blades of various lengths, a first frame member and a pair of second frame members, each of said second frame members including a first leg slidably engageable with said first frame member and a second leg disposed at an angle with respect to said first leg, said second legs extending in the same direction from said first frame member and being adapted to have a saw blade tensioned therebetween, each of said first blades being provided with a longitudinally extending slot closed at the opposite ends thereof, said first frame member having a pair of pins respectively extending transversely through said slots and being movable longitudinally therealong between a first position in substantial abutment with one end of the associated slot whereat said frame members are adjusted to accommodate saw blades of one length and a second position in substantial abutment with the other end of the associated slot whereat said frame members are adjusted to accommodate saw blades of another length, each of said slots having a main portion inclined with respect to a line through the ends thereof and having an offset portion at one end of said main portion to provide communication between the ends thereof, each of said main portions extending inwardly toward the associated offset portion and away from the associated blade, said first frame member and each of said second frame members having portions thereof in substantial abutment when said pins are at either end of the respectively associated slots so as to constrain said frame members against relative angular movement about the axes defined by said pins.

5. The saw blade holder set forth in claim 4, wherein said first frame member is hollow and receives therein said first legs of said second frame members.

References Cited in the file of this patent
UNITED STATES PATENTS

| | | |
|---|---|---|
| 1,023,216 | McQuillan | Apr. 16, 1912 |
| 2,912,025 | Thomas | Nov. 10, 1959 |

FOREIGN PATENTS

| | | |
|---|---|---|
| 423,541 | France | Feb. 17, 1911 |

UNITED STATES PATENT OFFICE
CERTIFICATE OF CORRECTION

Patent No. 3,002,542 October 3, 1961

Raymond C. Dreier

It is hereby certified that error appears in the above numbered patent requiring correction and that the said Letters Patent should read as corrected below.

Column 4, line 59, for "whereas" read -- whereat --; line 60, for "another length" read -- one length and a second position in substantial abutment with the other end of said slot whereat said saw blade holder is adjusted to accommodate saw blades of another length --.

Signed and sealed this 10th day of April 1962.

(SEAL)
Attest:

ERNEST W. SWIDER
Attesting Officer

DAVID L. LADD
Commissioner of Patents